United States Patent
Chang et al.

[11] Patent Number: 5,528,724
[45] Date of Patent: Jun. 18, 1996

[54] APPARATUS AND METHOD FOR ALIGNING OPTICAL FIBERS WITH RESPECT TO ONE ANOTHER

[75] Inventors: Kok-Wai Chang, Sunnyvale; Long Yang, Union City, both of Calif.

[73] Assignee: Hewlett-Packard Company, Palo Alto, Calif.

[21] Appl. No.: 404,688

[22] Filed: Mar. 15, 1995

[51] Int. Cl.⁶ ........................................... G02B 6/38
[52] U.S. Cl. .............. 385/137; 385/65; 385/38; 385/74
[58] Field of Search ............... 385/59, 74, 137, 385/65, 49, 38, 92, 83, 85, 89, 14, 34, 35, 71, 63, 136, 33

[56] References Cited

U.S. PATENT DOCUMENTS

| | | | |
|---|---|---|---|
| 4,265,513 | 5/1981 | Matsushita et al. | 385/22 |
| 4,805,976 | 2/1989 | Wilkening et al. | 385/38 |
| 5,257,332 | 10/1993 | Pimpinella | 385/35 |
| 5,359,683 | 10/1994 | Pan | 385/22 |

FOREIGN PATENT DOCUMENTS

| | | | |
|---|---|---|---|
| 0514722 | 11/1992 | European Pat. Off. | 385/59 |
| 2658067 | 6/1978 | Germany | 385/59 |
| 63-289509 | 11/1988 | Japan | 385/83 |

Primary Examiner—John Ngo

[57] ABSTRACT

An apparatus for aligning a plurality of optical fibers in predetermined positions with respect to one another. The apparatus includes a top plate and a bottom plate having a first set of alignment groves therein, there being one such grove corresponding to each optical fiber. The alignment groves are positioned such that the optical fibers will be in their correct positions with respect to one another when the optical fibers are forced against the bottom of the groves by the top plate. To reduce reflections from cut fiber ends that would normally be cut and polished, the optical fibers are cut at an angle with respect to the axis of the optical fiber and the cut end is bonded to an optical flat by a glue layer having the same index of refraction as the optical fiber. In the preferred embodiment of the present invention, the optical flat also includes an anti-reflective material on the non-glued surface thereof. The bottom plate is preferably fabricated using photolithographic etching techniques similar to those used in micro-machining and integrated circuit fabrication. This allows the bottom plates to be mass produced while maintaining the tight tolerances need for high light collection efficiencies. Various optical components can also be mounted on the bottom plates in groves with the aid of further groves in the bottom plates.

10 Claims, 7 Drawing Sheets

APPARATUS AND METHOD FOR ALIGNING OPTICAL FIBERS WITH RESPECT TO ONE ANOTHER

FIELD OF THE INVENTION

The present invention relates to systems utilizing fiber optics, and more particularly, to an improved arrangement for aligning optical fibers.

BACKGROUND OF THE INVENTION

In many applications, optical transmissions systems are utilized. Fiber optics provides a low cost method for transmitting a light signal from one point to another. In addition, fiber optics allow transmission over paths having geometries that are more complex than the straight line segments provided by conventional optics.

While optical transmission systems have many advantages, these systems are particularly problematic when light from one fiber must be coupled to a second fiber after being filtered or otherwise processed. Consider a system in which light leaves a first optical fiber, passes through an optical element of some sort, and is then re-imaged into a second optical fiber. In prior art systems, the end of the first optical fiber is cut at an angle to prevent reflections from the glass-air interface from propagating back down the optical fiber. In addition, the cut fiber must be polished to prevent imperfections resulting from the cutting operation from generating back propagating reflections. Finally, an anti-reflective coating is applied to the cut and polished end to further reduce reflections. The cost of treating each cut end in this manner imposes economic constraints on the use of systems in which light must exit a fiber and pass through air.

A second problem with such systems results from the high degree of alignment accuracy that is needed between the optical fibers. For single mode fibers, the ends must be aligned with a tolerance of the order of one micron. In addition, the fibers must be constrained from a rotational point of view. Even if one fiber is correctly fixed in space, the other fiber has two degrees of rotational freedom and three degrees of spatial freedom with respect to the fixed end of the first fiber. The high degree of alignment accuracy substantially increases the costs of systems of this type.

Broadly, it is the object of the present invention to provide an improved apparatus for aligning fibers relative to one another.

It is a further object of the present invention to provide an apparatus and method for reducing the reflectivity of cut fiber ends that does not require polishing of the ends.

It is a still further object of the present invention to provide an alignment apparatus that may be mass-produced at a much lower cost than prior art alignment mechanisms.

These and other objects of the present invention will become apparent to those skilled in the art from the following detailed description of the invention and the accompanying drawings.

SUMMARY OF THE INVENTION

The present invention comprises an apparatus for aligning a plurality of optical fibers in predetermined positions with respect to one another. The apparatus includes a top plate and a bottom plate having a first set of alignment groves therein, there being one such grove corresponding to each optical fiber. The alignment groves are positioned such that the optical fibers will be in their correct positions with respect to one another when the optical fibers are forced against the bottom of the groves by the top plate. To reduce reflections from cut fiber these optical fibers are cut at an angle with respect to the axis of the optical fiber, and the cut end is bonded to an optical flat by a glue layer having the same index of refraction as the optical fiber thereby preventing imperfections introduced by the cutting process from causing light to be reflected back into the fiber. Hence, the polishing steps used in prior art systems are avoided. In the preferred embodiment of the present invention, the optical flat also includes an anti-reflective material on the non-glued surface thereof. The bottom plate is preferably fabricated using photolithographic etching techniques similar to those used in micro-machining and integrated circuit fabrication. This allows the bottom plates to be mass produced while maintaining the tight tolerances need for high light collection efficiencies. Various optical components can also be mounted on the bottom plates in groves with the aid of further groves in the bottom plates.

DETAILED DESCRIPTION OF THE INVENTION

Figure 1:
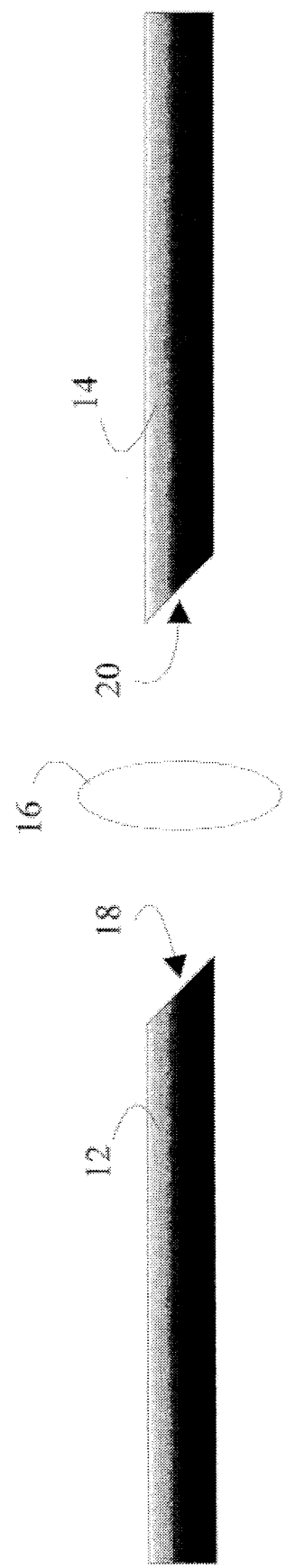
FIG. 1 illustrates the preparation of fiber ends in applications in which light from a first fiber is imaged into a second fiber.

The present invention may be more easily understood with reference to FIG. 1 which illustrates the imaging of light from a first fiber 12 into a second fiber 14 by a lens 16. As noted above, the ends of each fiber must be treated to avoid reflections generated at the glass-air interface from propagating back down the fiber. This treatment typically consists of cutting the end at an angle as shown at 18, polishing the end, and then coating the end with an anti-reflective coating. If a number of fibers must be positioned relative to one another, each end must be cut, polished, and coated.

Figure 2:
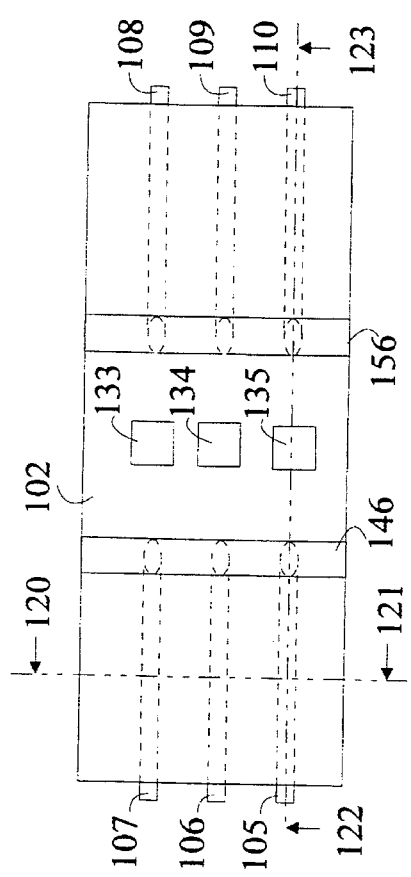
FIG. 2 is a top view of an alignment apparatus according to the present invention.
Figure 3:
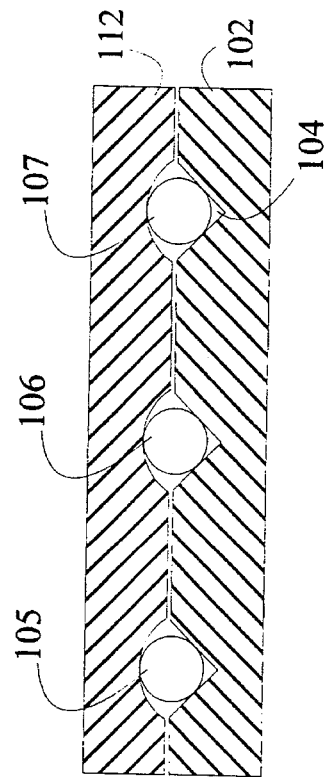
FIG. 3 is cross-sectional view of the alignment apparatus shown in FIG. 2 through line 120–121.
Figure 4:
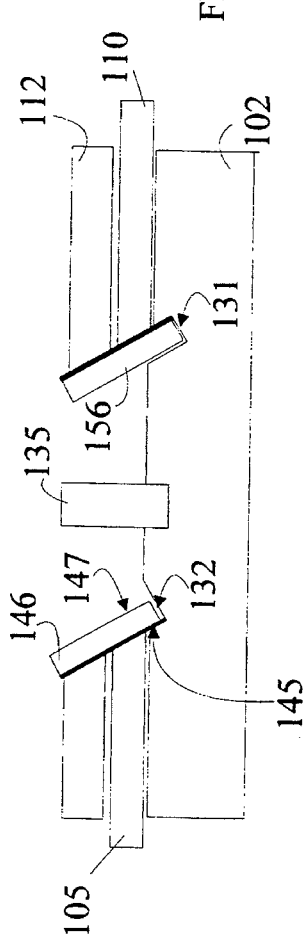
FIG. 4 is a cross-sectional view of the alignment apparatus shown in FIG. 2 through line 122–123.

Now refer to FIGS. 2, 3, and 4 which illustrate an apparatus according to the present invention for aligning several optical fibers with respect to one another and for pasivating the ends to reduce reflections. The required alignment tolerance is provided by a pedestal 102 which includes slots 104 that are positioned such that fibers that are forced against the bottom of each slot will be properly aligned with respect to one another. Exemplary fibers are shown at 105–110. The fibers are forced against slots 104 by top plate 112 which is preferably cemented to pedestal 102. The manner in which Pedestal 102 is constructed will be discussed in more detail below.

In the embodiment shown in FIGS. 2–4 the intervening optical components between each pair of fibers are indicated by blocks 133–135. Embodiments which specific optical elements will be discussed in more detail below.

Refer now to FIG. 4 which illustrates the manner in which the ends of the optical fibers are treated to prevent light from reflecting back down the fibers at the glass-air interfaces. After the fibers have been secured against the bottom pedestal by the top plate, each fiber is cut at the desired angle by making a saw cut through the top plate 112. The cut extends into pedestal 102 as shown at 131 and 132. The saw cut severs each fiber at the correct angle. It should be noted that a single saw cut severs multiple fibers. In contrast to prior art systems, the ends of the optical fibers are not polished after the saw cut. Instead, a plate 146 is cemented to the fiber ends with the aid of a layer 145 of transparent cement. The index of refraction of the cement is chosen to match the index of the core of refraction of the fiber in the case of a single mode fiber. If the fiber is a GRIN lens, the index is chosen to match the index of the central region of the GRIN lens. Plate 146 is constructed from a material that has the same index of refraction as the cement layer. Hence, any scratches on the side of plate 146 that is in contact with the cement layer or on the cut fiber end are eliminated by the layer of cement. The surface 147 of plate 146 that is not in contact with the cement layer is preferably coated with an anti-reflective material to further reduce reflections.

It should be noted that plate 146 is an inexpensive component that need only have one optically flat surface, i.e., surface 147. Hence, apparatus 100 can be constructed at a cost that is substantially less than the cost of systems in which the fiber ends are polished and coated with the anti-reflective material. It has been found experimentally, that the anti-reflection system of the present invention functions as well as the conventional cut and polished end system. Thus, the present invention provides the benefits of the prior art systems at a substantially reduced cost.

Pedestal 102 may be fabricated using conventional photolithography techniques. Such techniques provide the required alignment precision and are easily mass produced. Techniques for providing V-groves in Silicon or Ceramics are well known to the micro-machining arts. For example, in the case of a silicon substrate, a KOH etchant may be used. KOH provides a non-iostropic etch in which the etch rate of the (111) plane is so low that the etch process is practically stoped at the (111) planes. Hence, an etch mask oriented toward the (110) direction on a (100) silicon wafer will result in a V-groove formed by two (111) planes intercepting each other at a precise angle of 70.53°. The depth of the V-groove is solely determined by the width of the mask opening. Hence, two-dimensional lithography may be used to create a precise three-dimensional V-groove structure.

Figure 5:
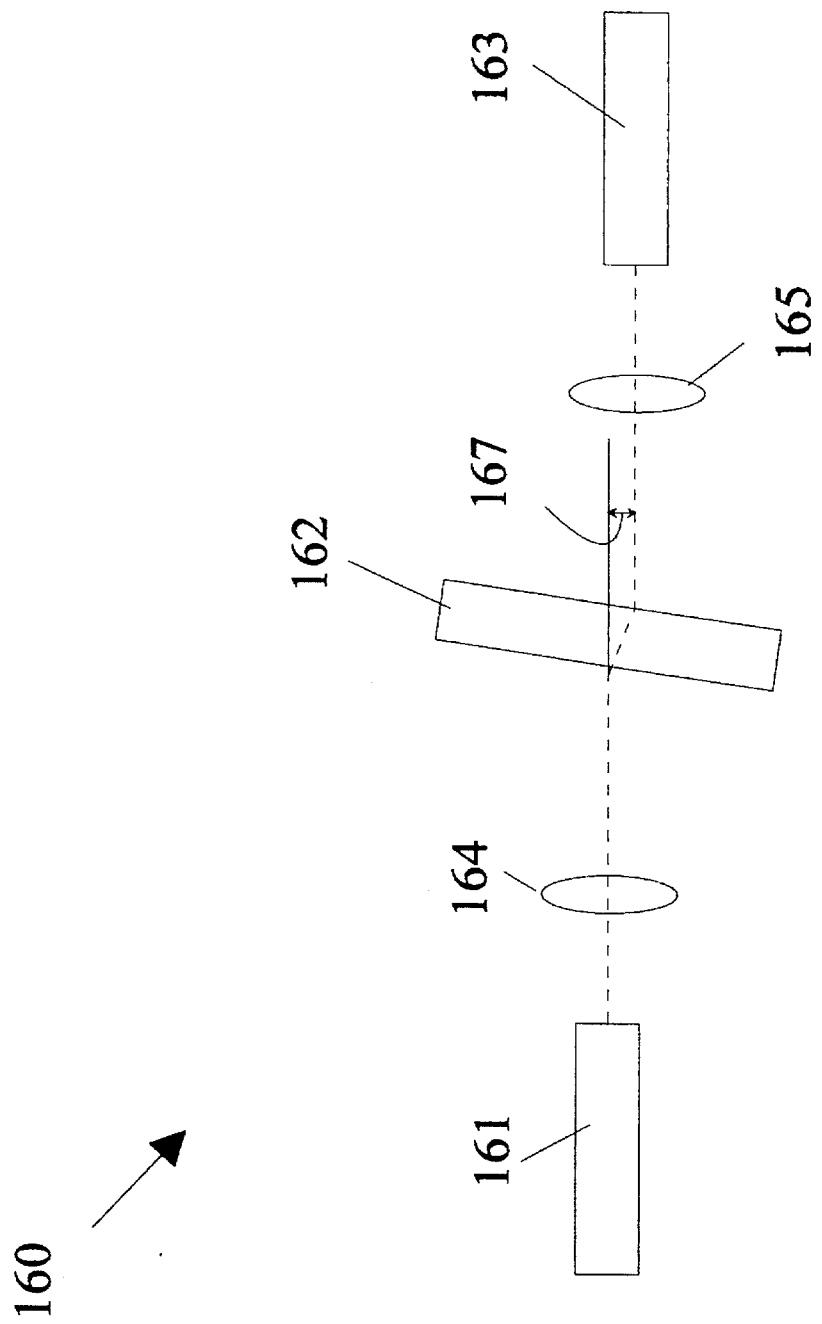
FIG. 5 is a cross-sectional view of an optical processing arrangement illustrating the alignment problems introduced by optical processing elements.

The ability to mass produce optical platforms having precise fixed alignment enables the present invention to be used for a number of optical components. In many applications, light traveling down a first optical fiber must be filtered, polarized, or otherwise processed by some optical component before proceeding down a second optical fiber. The general arrangement for such processing is shown in FIG. 5 at 160. Light traveling down optical fiber 161 is colliminated by lens 164 and than passes through optical component 162. The light leaving component 162 is then collected by a second lens 165 which images that light into the output optical fiber 163. To eliminate reflections back down optical fiber 161, optical component 162 is positioned such that the normal to its surface is at an angle with respect to the optical axis of optical fiber 161. Because of the difference in index of refraction of component 162 and air, this angular displacement results in the light leaving component 162 being displaced with respect to the optical axis of optical fiber 161 by an amount 167 that depends on the thickness and index of refraction of component 162. As noted above, the alignment of optical fiber 163 must be tightly controlled to maintain high light collection efficiency.

In prior art optical processing systems, the cost of aligning the fibers for each different optical component is very high. The present invention provides a means for mass producing very accurately aligned optical fibers and components; hence, an alignment platform according to the present invention is a significant improvement over the prior art.

Figure 6:
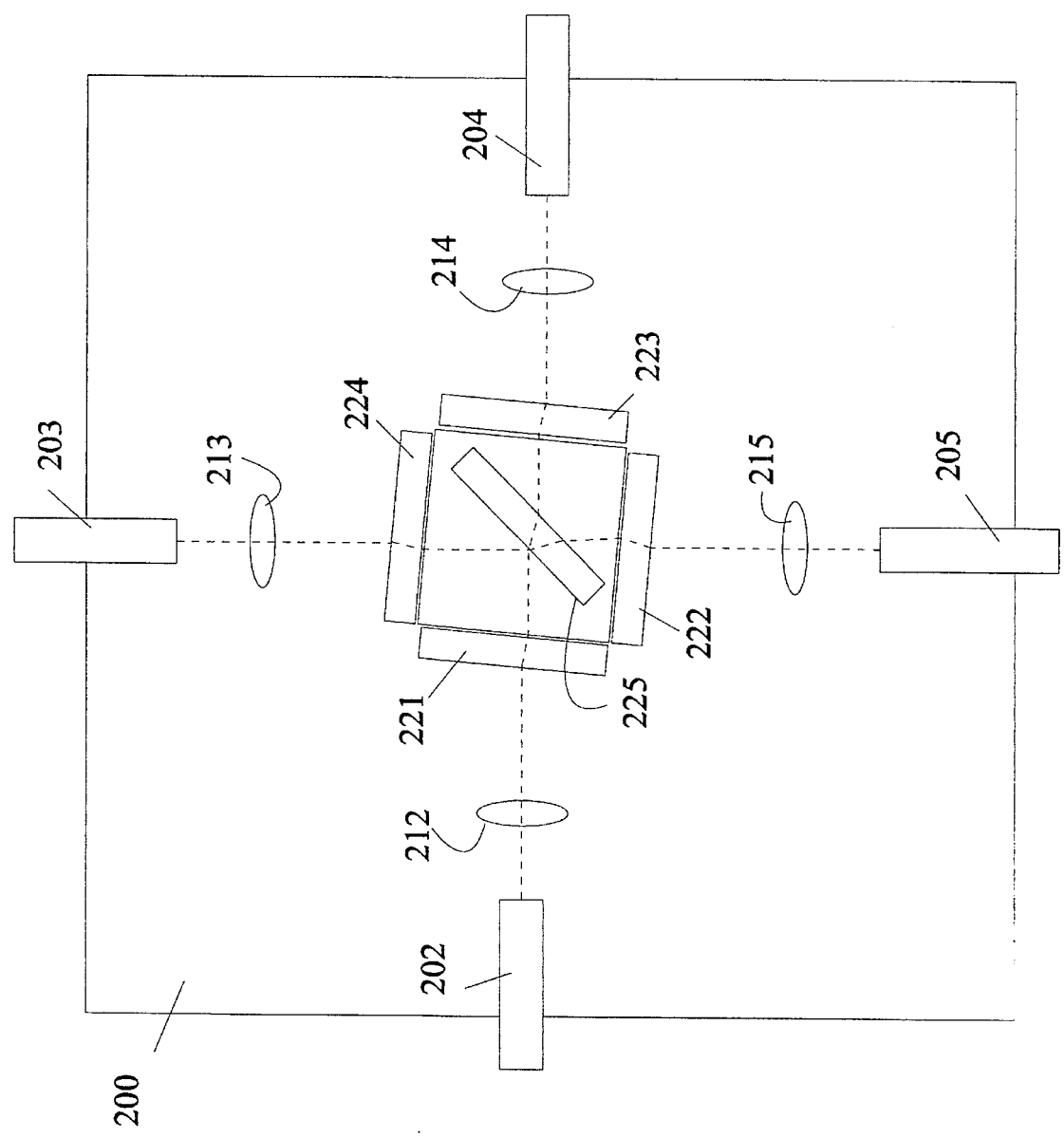
FIG. 6 is a top view of a universal collimating platform according to the present invention.

In particular, the present invention may be utilized to construct a universal optical platform for processing light traveling between four optical fibers or subsets thereof. A top view of such a platform is shown in FIG. 6 at 200. Platform 200 processes light from optical fibers 202–205. Light may either enter or leave the platform via any of the fibers. The light leaving or entering a fiber is imaged or collimated by a corresponding lens. The lenses corresponding to optical fibers 202–205 are shown at 212–215, respectively. The actual processing of the light is performed by a coating applied to one or more of the 5 optical elements shown at 221–225.

Platform 200 may be used to filter or polarize light traveling between two fibers that are opposite one another such as fibers 202 and 204. Platform 200 may also be used to construct a beam splitter or wavelength division multiplexer by utilizing the fibers that are arranged at right angles to these fibers.

All of the above described functions may be accomplished by utilizing different optical coatings on the optical elements 221–225. These optical elements are transparent and preferably planar. In the absence of any coatings on optical elements 221–225, the fibers are aligned such that light leaving fiber 202 is imaged into fiber 204. Similarly, light leaving fiber 205 is imaged into fiber 203. Finally, light leaving fiber 202 and reflected from optical element 225 is imaged into fiber 203. This alignment takes into account any beam walk-off produced by the passage of the light through the various optical elements. It should be noted that elements 221–224 are preferably positioned such that light reflected from their surfaces is not imaged back into fiber from which it originated.

The platform on which the various components are mounted is preferably manufactured as described above. In all applications, all five of the optical components must be in place. For any particular application, one or more of the optical components are coated with thin film that provided the required optical processing. For example, if a beam splitter is to be constructed, the surface of optical element 225 is coated with a partially reflecting coating. If a filtering or polarizing operation is to be performed between fibers 202 and 204, the surface of either element 221 or 223 is coated. Since the coatings are much thinner than the optical elements, any walk-off resulting from a difference in thickness of the coated element can be neglected. Thus a single mass produced optical assembly may be used for a large number of applications without the need to align the apparatus for each new application.

The above described embodiment of platform 200 utilized a lens that was separate from the adjacent optical element to image the light from the optical element into the corresponding optical fiber. However, it will be apparent to those skilled in the art that the lens could be combined with the optical element if non-planar optical elements are acceptable.

There are a number of other optical processing apparatuses that may advantageously be constructed using an optical alignment platform according to the present invention. For example, optical amplifiers may be constructed on such a platform. The manner in which a typical optical amplifier operates may be more easily understood with reference to FIG. 7 which is schematic drawing of a prior art Er-doped fiber embodiment of an optical amplifier 300. Optical amplifier 300 amplifies a light signal input on a fiber 302. The input side of the fiber 302 is isolated by an optical isolator 303. The light is amplified in Er-doped fiber loop 305 which is pumped by lasers 304 and 306. The pumping light is coupled into loop 305 by wave division multiplexers (WDMs) 309 and 310. The amplified light from loop 305 is then filtered to remove any light at the pump frequency. The output end of fiber 302 is isolated from components on the output side of fiber 302 by isolator 307. The optical isolators prevent lasing in the amplifier by assuring that light only travels in one direction in Er-doped fiber loop 305.

Figure 7:
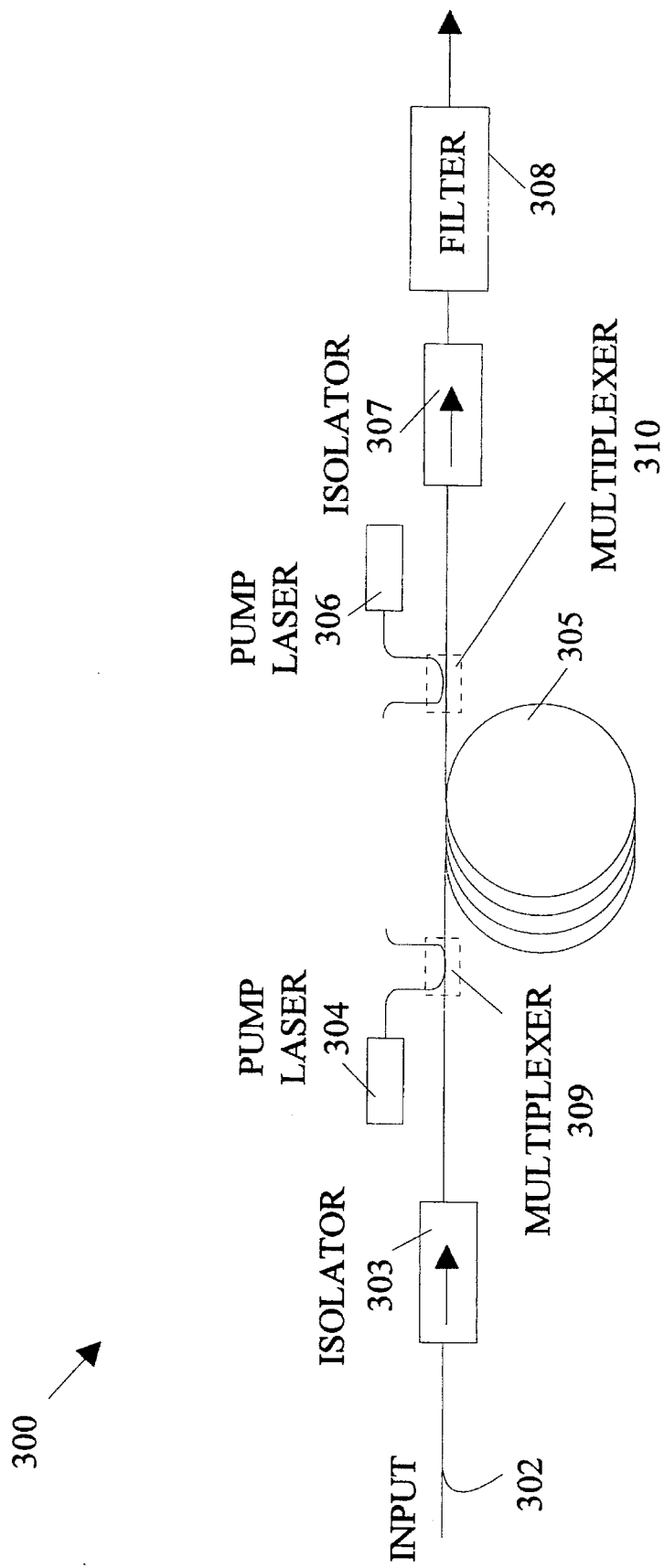
FIG. 7 is a schematic drawing of a conventional optical amplifier.
Figure 8:
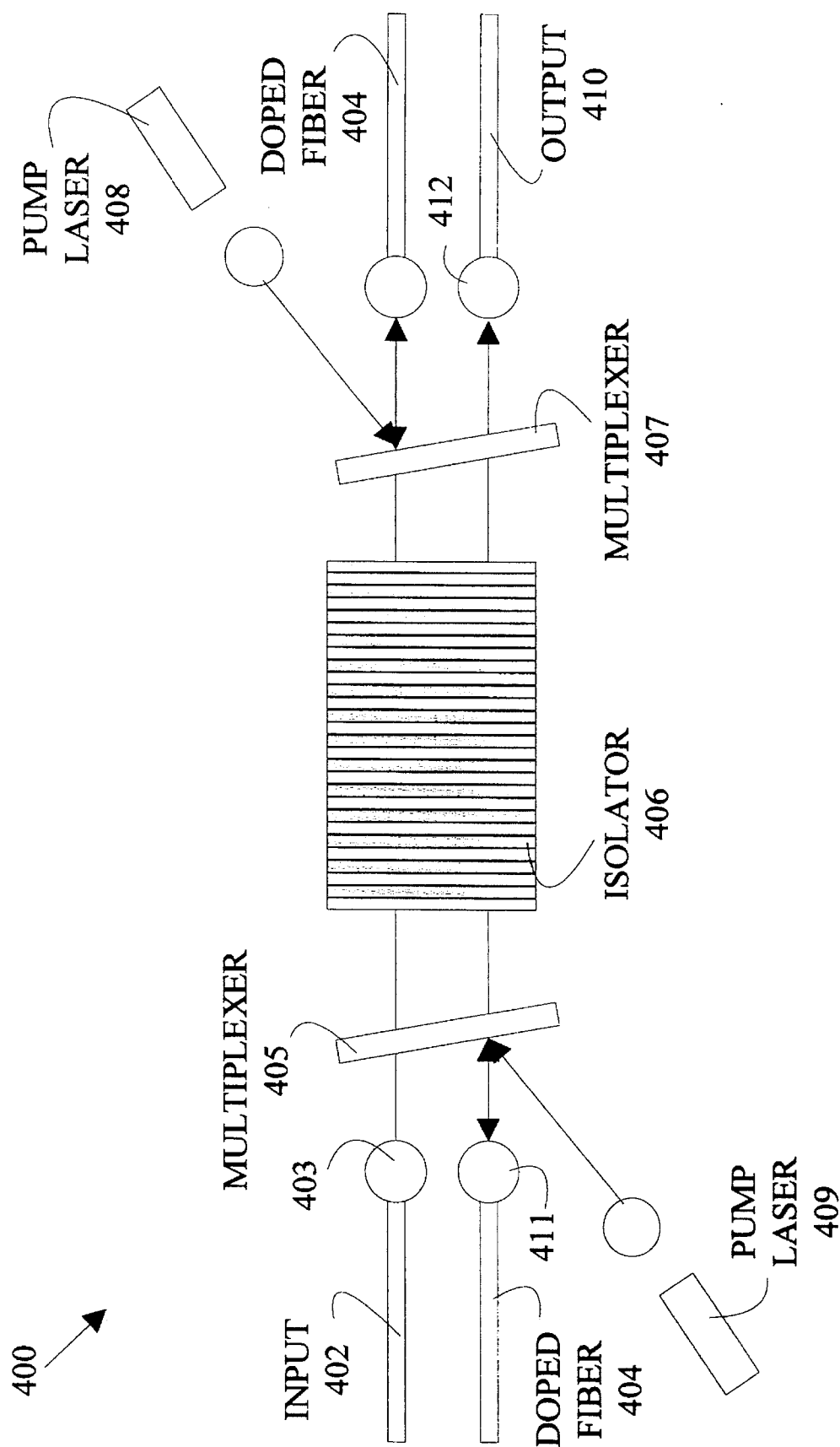
FIG. 8 is top view of one embodiment of an optical amplifier according to the present invention.

Refer now to FIG. 8 which is schematic drawing of an embodiment of an Er-doped fiber optical amplifier according to the present invention for amplifying a signal received on optical fiber 404. The amplified light signal is coupled to optical fiber 410. The light signal received on optical fiber 402 is collimated by ball lens 403 and enters Er doped optical fiber 404 after passing through isolator 406 and WDM 407. Light from pump laser 408 is reflected from the surface of WDM 407 and also enters this end of doped fiber 404. Optical isolator 406 preforms functions analogous to isolators 303 and 307 shown in FIG. 7. The light signal is amplified as it passes through doped fiber 404. The amplified signal is imaged by ball lens 412 into output fiber 410.

To improve the pumping of doped fiber 404, a second pump laser 409 and WDM 405 are included in the preferred embodiment of the present invention. The second pumping system allows the doped fiber to pumped from both ends. Optical isolator 406 prevents the light from pump laser 409 from escaping through output fiber 410.

It should be noted that a single optical isolator 406 performs the isolation functions of the two isolators described above with reference to the optical amplifier shown in FIG. 7. Hence, in addition to providing an optical amplifier that can be assembled on an inexpensive massproduced platform, optical amplifier 400 eliminates one optical isolator. It should be noted that the cost of the optical isolators in optical amplifiers of the type shown in FIG. 7 is a significant fraction of the cost of such amplifiers. Hence, this embodiment of the present invention provides additional advantages over prior art optical amplifiers.

Figure 9:
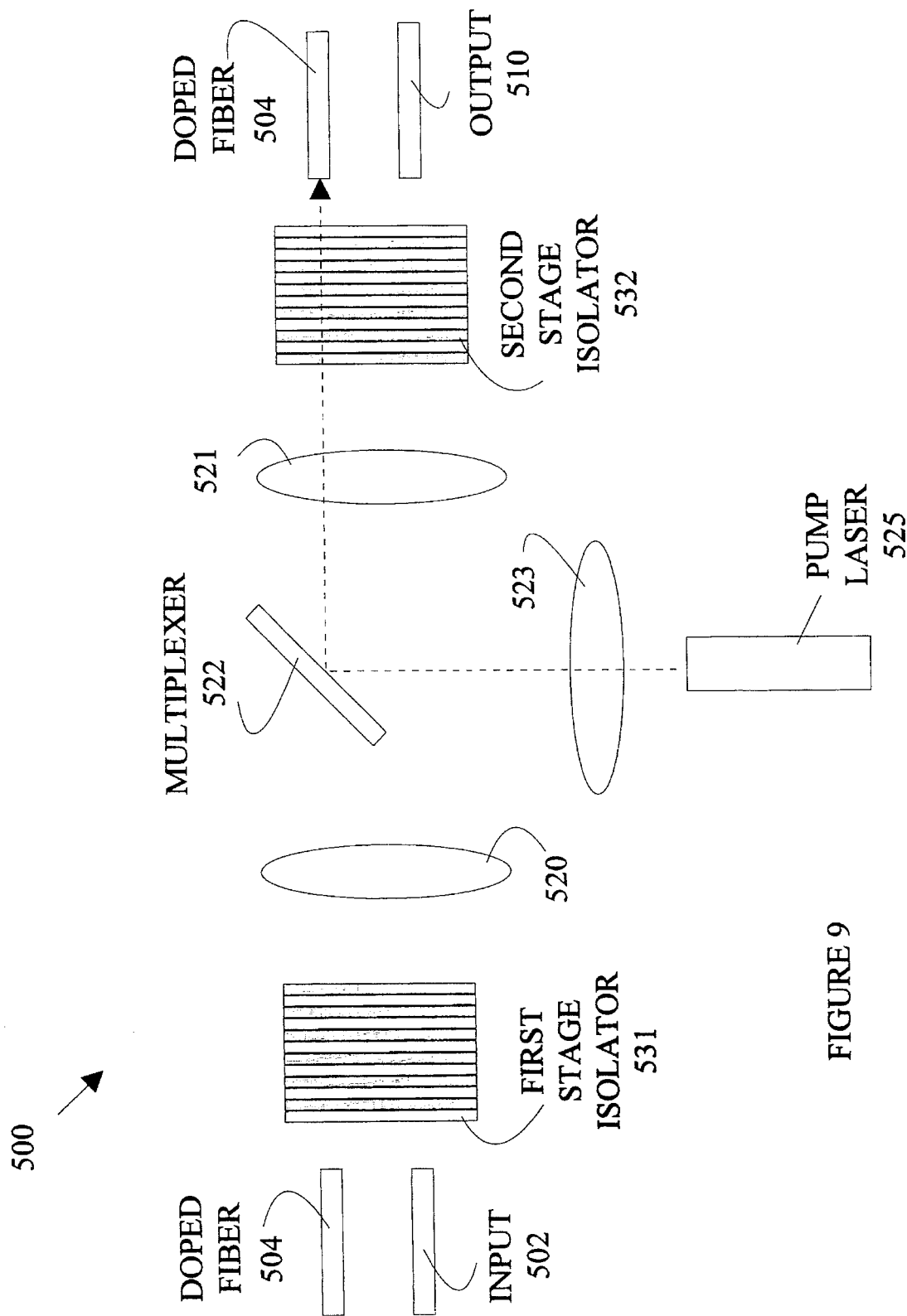
FIG. 9 is a top view of another embodiment of an optical amplifier according to the present invention.

An alternative embodiment of an optical amplifier according to the present invention is shown in FIG. 9 at 500. This embodiment utilizes two optical isolators 531 and 532 to assure that light travels in only one direction in Er-doped fiber 504; however, in contrast to optical amplifier 400, this embodiment requires only one pump laser. The input light is received on fiber 502, and the amplified light signal exits through fiber 510. The Er-doped fiber 504 is coupled to the amplifier via isolators 531 and 532. The Er-doped fiber is pumped by laser 525 which is coupled to fiber 504 via WDM 522.

Lenses 520–523 provide the required imaging functions. Lenses 520–521 couple the light from input fiber 502 into fiber 504, and the light exiting fiber 504 into output fiber 510. Lens 523 images the pumping light into fiber 504.

Various modifications to the present invention will become apparent to those skilled in the art from the foregoing description and accompanying drawings. Accordingly, the present invention is to be limited solely by the scope of the following claims.

What is claimed is:

1. An apparatus for aligning a plurality of optical fibers in predetermined positions with respect to one another, said apparatus comprising:

a top plate;

a bottom plate having a first set of alignment grooves therein, there being each of said groove corresponding to each of said optical fibers, said alignment grooves being positioned such that said optical fibers will be in said predetermined positions with respect to one another when said optical fibers are forced against the bottom of said grooves by said top plate; and means for fastening said top and bottom plates such that said top plate forces said optical fibers against said grooves in said bottom plate, wherein said plurality of optical fibers includes first and second optical fibers, said first optical fiber being aligned such that light leaving said first optical fiber enters said second optical fiber; and at least two of said optical fibers are cut at an angle other than 90 degree with respect to the axis of said optical fibers and said cut ends are bonded to an optical flat by a glue layer having the same index of refraction as one said optical fibers.

2. The apparatus of claim 1 wherein one surface of said optical flat is coated with an anti-reflective material.

3. The apparatus of claim 1 wherein said groves in said bottom plate are generated by photolithographically etching said bottom plate.

4. The apparatus of claim 1 wherein said bottom plate further comprises means for positioning an optical component with respect to said optical fibers.

5. The apparatus of claim 4 wherein said optical component is a lens.

6. The apparatus of claim 1 wherein said optical fibers are arranged such that light leaving one of said plurality of optical fibers passes through a first lens, an optical element, a second lens and is imaged by said second lens into another of said plurality of optical fibers.

7. An apparatus for aligning a plurality of optical fibers in predetermined positions with respect to one another, said apparatus comprising:

a top plate;

a bottom plate having a first set of alignment groove; therein, there being each of said grooves corresponding to each said optical fiber, said alignment grooves being positioned such that said optical fibers will be in said predetermined positions with respect to one another when said optical fibers are forced against the bottom of said grooves by said top plate; and means for fastening said top and bottom plates such that said top plate forces said optical fibers against said grooves in said bottom plate, wherein said optical fibers are arranged such that light leaving one of said plurality of optical fibers passes through a first lens, an optical element, a second lens and is imaged by said second lens into a second one of said plurality of optical fibers, and wherein said optical element comprises an optical isolator and a wave division multiplexer.

8. The apparatus of claim 7, wherein at least one of said optical fibers is cut at an angle with respect to the axis of one of said optical fiber and wherein said cut end is bonded to an optical flat by a glue layer having same refractive index as of one of said optical fiber.

9. The apparatus of claim 8, wherein one surface of said optical flat is coated with an anti-reflective material.

10. The apparatus of claim 7, wherein said grooves in said bottom plate are generated by photolithographically etching said bottom plate.

* * * * *